(12) United States Patent
Satou et al.

(10) Patent No.: US 7,774,517 B2
(45) Date of Patent: Aug. 10, 2010

(54) INFORMATION PROCESSING APPARATUS HAVING AN ACCESS PROTECTION FUNCTION AND METHOD OF CONTROLLING ACCESS TO THE INFORMATION PROCESSING APPARATUS

(75) Inventors: Koutarou Satou, Kanagawa (JP); Hitoshi Suzuki, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 119 days.

(21) Appl. No.: 11/808,106

(22) Filed: Jun. 6, 2007

(65) Prior Publication Data

US 2008/0005427 A1 Jan. 3, 2008

(30) Foreign Application Priority Data

Jun. 12, 2006 (JP) .............................. 2006-162487

(51) Int. Cl.
*G06F 3/00* (2006.01)
(52) U.S. Cl. .............................. 710/36; 710/3; 710/37; 710/38; 710/39

(58) Field of Classification Search ...................... None
See application file for complete search history.

(56) References Cited

U.S. PATENT DOCUMENTS 7,434,264 B2 * 10/2008 Moyer et al. .................. 726/28
2004/0098604 A1 * 5/2004 Noldge ........................ 713/193
2006/0149911 A1 * 7/2006 Kimelman et al. .......... 711/163

FOREIGN PATENT DOCUMENTS

JP 2003-280988 10/2003

* cited by examiner

*Primary Examiner*—Alan Chen
(74) *Attorney, Agent, or Firm*—McGinn IP Law Group, PLLC

(57) ABSTRACT

An information processing apparatus according to an embodiment of the present invention includes: a CPU; a plurality of peripheral devices connected to the CPU through a bus; and a peripheral access protection setting unit storing access protection information representing whether an access to each of the peripheral devices is permitted or inhibited in accordance with a task to be performed by the CPU, wherein an access by the CPU to the peripheral devices is limited based on the access protection information and address information of the peripheral device.

11 Claims, 10 Drawing Sheets

INFORMATION PROCESSING APPARATUS HAVING AN ACCESS PROTECTION FUNCTION AND METHOD OF CONTROLLING ACCESS TO THE INFORMATION PROCESSING APPARATUS

BACKGROUND OF THE INVENTION

1. Field of the Invention

The present invention relates to an information processing apparatus having a protective function of protecting a peripheral device from accesses of a CPU (Central Processing Unit) and a method of controlling an access to the information processing apparatus.

2. Description of Related Art

A CPU outputs a control signal at the time of accessing a peripheral device, and predetermined processing is carried out. For example, if the peripheral device is a hard disk device, a data read/write task is executed between the CPU and the hard disk device. Upon reading data, the CPU outputs a read signal, and in addition, data is output from a designated address of a hard disk device. Upon writing data, the CPU outputs a write signal, and in addition, data is stored at a designated address of the hard disk device. The control signal output from the CPU contains designated address information of a hard disk as well as a read/write signal.

For example, if important data to protect is stored in the hard disk device, a technique of protecting the data from accesses by the CPU is necessary. Such protection technique is applicable to peripheral devices other than the hard disk device. For example, it is necessary to protect an I/O device such as an interrupt controller or a timer from accesses by the CPU.

Japanese Unexamined Patent Application Publication No. 2003-280988 discloses a technique of protecting a peripheral device from an access by the CPU based on an access request. According to the technique of Japanese Unexamined Patent Application Publication No. 2003-280988, a register for controlling an access by the CPU is provided for each address of a peripheral device, and whether to allow an access or not is set in the control register for each address of a peripheral device. In this way, the technique of Japanese Unexamined Patent Application Publication No. 2003-280988 determines a peripheral device to protect from accesses by the CPU on the address basis.

However, the inventors of the subject application have recognized that the above related art has the following problems. In a control device of Japanese Unexamined Patent Application Publication No. 2003-280988, it is necessary to provide an H/W (Hardware) component such as a register and comparator for allowing/disallowing accesses, for each address of a peripheral device. For example, in the case of protecting an I/O device mapped to a memory-mapped I/O region, it is necessary to protect a wide address range because one I/O device has plural addresses over a wide range. Thus, protection needs to be executed over a wide address range as in this case, there arises a problem that the number of protectable peripheral devices is limited due to limitations on H/W.

SUMMARY

In one embodiment of the present invention, an information processing apparatus includes: a CPU; a plurality of peripheral devices connected to the CPU through a bus; a peripheral access protection setting unit storing access protection information representing whether an access to each of the peripheral devices is permitted or inhibited in accordance with a task to be performed by the CPU; and an access control unit controlling an access to the plurality of peripheral devices based on the access protection information and address information of the peripheral device.

As described above, the peripheral device to protect from an access from the CPU is set based on access protection information representing whether to permit or inhibit an access to each peripheral device in accordance with the kind of task to be performed by the CPU. As a result, it is unnecessary to set a peripheral device to protect from an access from a CPU for each address and provide H/W for each address.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Embodiments of the present invention are described below. For definite explanation, components in the following description and the accompanying drawings are omitted and abbreviated and repetitive description of the components is omitted if not necessary.

First Embodiment

To begin with, a purpose of protecting a peripheral device from accesses by a CPU is described below. Incidentally, protecting a peripheral device from accesses by a CPU not to read/write data in response to an access request from the CPU is referred to as "access protection". The embodiments of the present invention describe an example of access protection function to fulfill the following purposes. First, a peripheral device set as an access protection region is protected based on access protection information set by a user. That is, it is ensured that a peripheral device state is not updated by an unauthorized access. Second, if a first access is unauthorized, a user is informed about the access. Third, if an unauthorized access is made, a signal to stop an access is output. Until this signal is cancelled, accessed to the peripheral device set as an access protection region are prevented.

Figure 1:
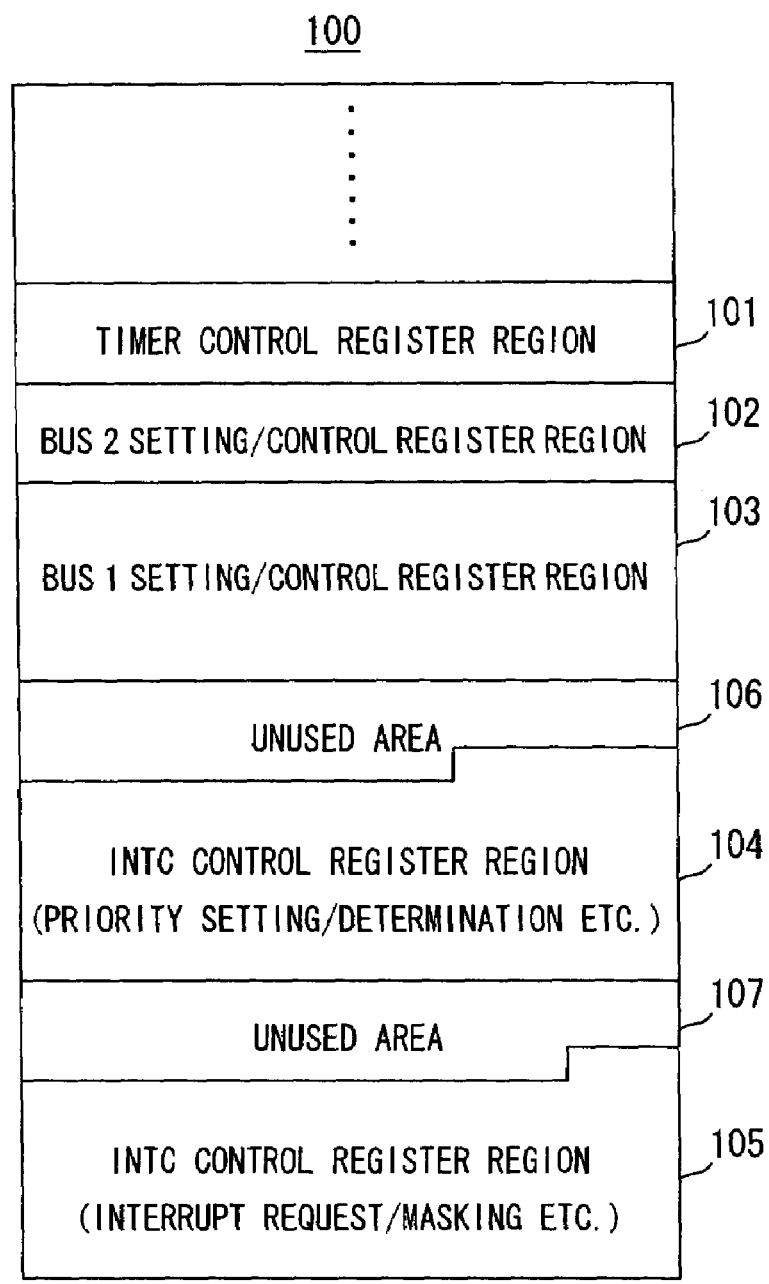
FIG. 1 shows a configuration example of a memory-mapped I/O according to a first embodiment of the present invention.

Referring to the accompanying drawings, a device having an access protection function according to a first embodiment of the present invention is described. This embodiment describes a single-chip information processing apparatus integrated to a semiconductor element such as an LSI. However, this embodiment is not limited to the one-chip information processing apparatus. Further, this embodiment describes the configuration for protecting a memory-mapped I/O from a CPU by way of example. The memory-mapped I/O is described in detail below FIG. 1 shows an example of a memory-mapped I/O. The memory-mapped I/O is a memory space to which a peripheral device called "I/O device" is mapped. In FIG. 1, I/O devices such as a timer control register region 101, a bus 2 setting/control register region 102, a bus 1 setting/control register region 103, and two INTC control register regions 104 and 105 are mapped. As understood from the INTC control register regions 104 and 105, related registers are not always included in the same region. Incidentally, a memory-mapped I/O 100 of FIG. 1 includes two unused areas 106 and 107.

Each of the regions of the memory-mapped I/O is according to a peripheral device accessed by a CPU to write/read data. Hereinafter, the peripheral device is referred to as "I/O device". Incidentally, it is possible to map I/O devices other than these I/O devices. Further, mapping positions of each I/O device (arrangement in a memory space) is not limited to the positions of FIG. 1.

Figure 2:
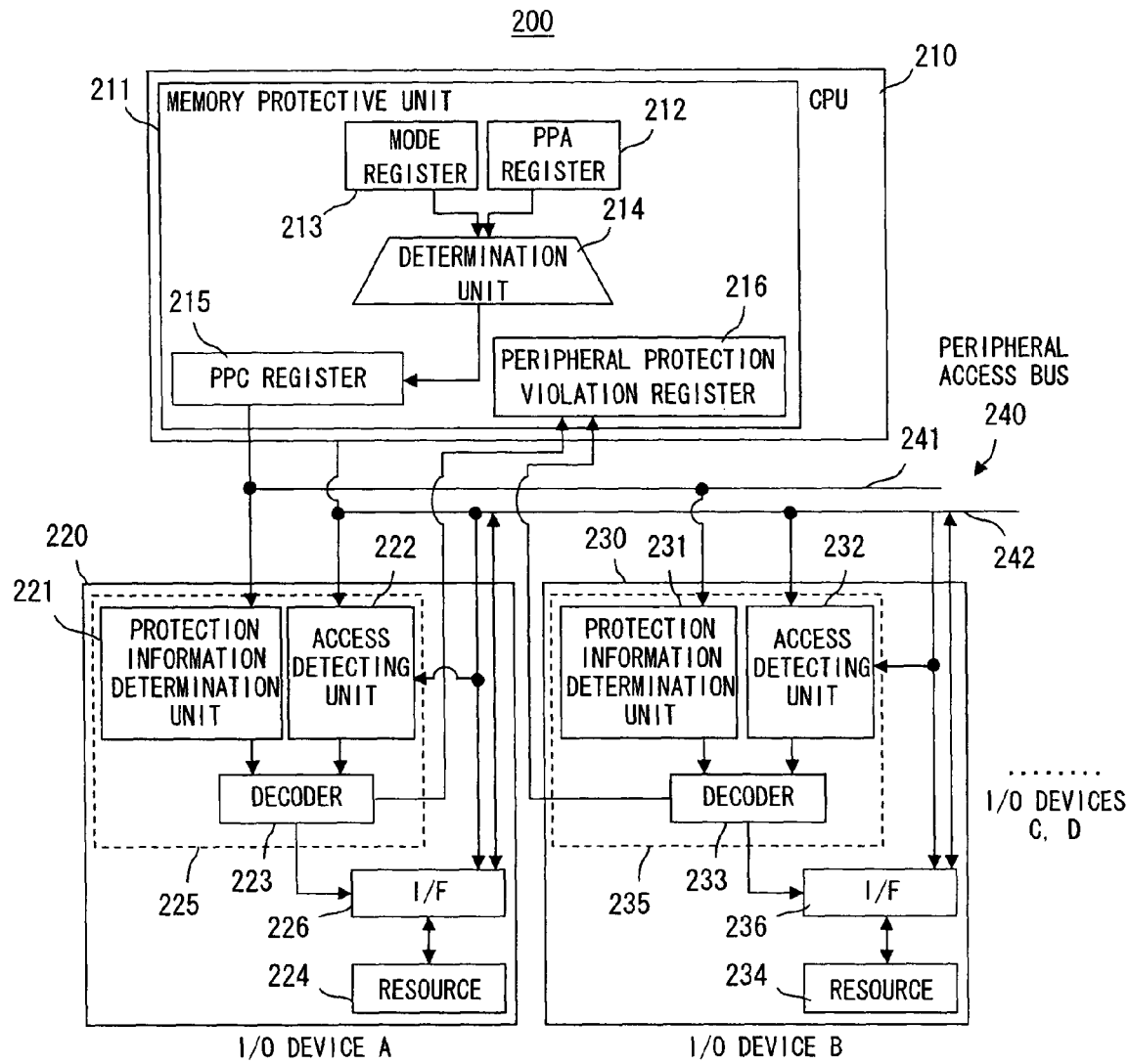
FIG. 2 is a block diagram of an information processing apparatus of the first embodiment.

Referring to FIG. 2, the information processing apparatus of the first embodiment is described next. FIG. 2 is a block diagram of the information processing apparatus of the first embodiment. An information processing apparatus 200 includes a CPU 210, two I/O devices 220 and 230, and a peripheral access bus 240. The CPU 210 includes a memory protective unit 211. The memory protective unit 211 includes a PPA (Peripheral Protection Address) register 212, a mode register 213, a determination unit 214, a PPC (Peripheral Protection Control) register 215, and a peripheral protection violation register 216.

The I/O device 220 includes a protection information determination unit 221, an access detecting unit 222, a decoder 223, an interface unit (hereinafter referred to as "I/F") 226, and a resource 224. Further, the protection information determination unit 221, the access detecting unit 222, and the decoder 223 constitute an access control circuit 225. The I/O device 230 includes, similar to the I/O device 220, a protection information determination unit 231, an access detecting unit 232, a decoder 233, an interface unit (hereinafter referred to as "I/F") 236, and a resource 234. The protection information determination unit 231, the access detecting unit 232, and the decoder 233 constitute an access control circuit 235.

The resources 224 and 234 are registers accessed by the CPU 210 to read/write data and correspond to, for example, each register of the memory-mapped I/O of FIG. 1. Thus, it is possible to provide the information processing apparatus 200 with an I/O device having resources usable for various purposes in accordance with function. The information processing apparatus 200 of FIG. 1 includes two I/O devices 220 and 230 but may include one device or three or more devices. The CPU 210 and the I/O devices 220 and 230 are connected together through the peripheral access bus 240. Incidentally, components of the I/O devices 220 and 230 other than the resources 224 and 234 are described later in detail.

The memory protective unit 211 is a unit having a function of limiting accessed to the I/O devices 220 and 230 (access protection function). Each component of the memory protective unit 211 is described later in detail. The PPA register 212 stores address information regarding an address range of an I/O device to be protected from accesses by the CPU 210. That is, the PPA register 212 is a protection address setting unit that sets an address range of a peripheral device to be protected against accesses by the CPU 210. If the CPU 210 makes an access to an address set in the PPA register 212, the memory protective unit 211 activates a signal indicating that the address is a target of access protection. If an access request is made to access an address out of the address range set in the PPA register 212, the memory protective unit 211 does not execute access protection. That is, whether or not to permit an access by the CPU 210 is determined based on the access range set in the PPA register 212. A region not involved in the access protection function can be defined by setting the PPA register 212 this way.

The mode register 213 stores information about whether a mode of the CPU 210 is a privileged mode or a user mode. The CPU 210 can switch its mode between the privileged mode and the user mode if accesses to the I/O device are prohibited. The privileged mode is used for executing an OS (Operating System), and allows accesses to any I/O device irrespective of access protection information. The user mode is used for executing application programs other than the OS and disallows accesses to some I/O devices. If the CPU 210 is reset, the mode register 213 is initialized in the privileged mode. After that, settings of the mode register 213 are switched by the OS. The mode is shifted from the privileged mode to the user mode, and then the CPU 210 executes a task. If violation is detected at the time of executing a task in the user mode, the mode is automatically switched to the privileged mode. The access control according to the first embodiment is carried out in the user mode. Incidentally, the task refers to a unit executable by an OS, and the OS performs management switches tasks, and a task is also commonly referred to as a thread.

The determination unit 214 determines whether or not the CPU 210 outputs an access request signal based on information of the PPA register 212 and information of the mode register 213. That is, it is determined whether or not a signal from the PPA register 212 is active and whether a signal of the mode register 213 represents a privileged mode or user mode. If a signal of the PPA register 212 is active, and a signal of the mode register 213 represents a user mode, a signal from the CPU 210 is sent to the PPC register 215. If a signal of the PPA register 212 is not active or if a signal of the mode register 213 represents a privileged mode, an access request signal from the CPU 210 is not output to the PPC register 215.

The PPC register 215 is a register for storing setting information on the I/O device protected from an access request of the CPU 210. The PPC register 215 designates not an address of an I/O device to protect but the I/O device to protect itself. That is, code information for designating an I/O device, not address, is set in the PPC register 215. The code information defines whether or not to protect each I/O device from an access request from the CPU 210 when the CPU 210 executes a task. That is, the code information is access protection information obtained by associating the kind of task executed by the CPU 210 with an access protection type that represents whether an access to each peripheral device is permitted or inhibited. Referring to Table 1, a code information example set in the PPC register 215 is described below.

TABLE 1

| Task No. | Cord information | I/O device to protect | | | |
|---|---|---|---|---|---|
| | | I/O device A | I/O device B | I/O device C | I/O device D |
| 1 | 123 | permitted | permitted | inhibited | inhibited |
| 2 | 123 | permitted | permitted | inhibited | inhibited |
| 3 | 456 | inhibited | permitted | permitted | inhibited |
| 4 | 456 | inhibited | permitted | permitted | inhibited |
| 5 | 789 | permitted | inhibited | inhibited | permitted |

Table 1 shows I/O devices A, B, C, and D protected from an access request from the CPU 210. For example, the I/O device A can be associated with the INTC control register regions (interrupt register regions) 104 and 105 of FIG. 1 for illustrative purposes. Likewise, the I/O device B can be associated with the bus 1 setting/control register region 103, the I/O device C can be associated with the bus 2 setting/control register region 102, and the I/O device D can be associated with the timer control register region 101.

For example, if the CPU 210 executes a task 1, "123" as code information (decimal number) is set in the PPC register 215. The code information can be set in the PPC register 215 by the OS switching tasks in the privileged mode. Here, the code information is assumed decimal number, but in practice, a binary code corresponding to the decimal number is set in the PPC register 215. If the code information of 123 is set in the PPC register 215, accesses to the I/O devices A and B are permitted but accesses to the I/O devices C and D are inhibited. That is, the code information associates tasks with I/O devices to protect. The PPC register 215 is a peripheral access protection setting unit for storing access protection information that defines whether an access to each I/O device is permitted or inhibited in accordance with a task executed by the CPU 210.

In the case of executing a task 2 as well, a code of 123 is set in the PPC register 215 similar to the task 1. Thus, at the time of executing the task 2, a request to access the I/O devices A and B is accepted but a request to access the I/O devices C and D is rejected similar to the request to access the task 1.

On the other hand, if the CPU 210 executes a task 3, code information of 456 is set in the PPC register 215. Accordingly, a request to access the I/O devices B and C is accepted, and a request to access the I/O devices A and D is rejected. Likewise, in the case of executing a task 4 as well, a code of 456 is set in the PPC register 215 similar to the task 3. Hence, at the time of executing the task 4, a request to access the I/O devices B and C is accepted but a request to access the I/O devices A and D is rejected similar to the task 3.

Further, if the CPU 210 executes a task 5, code information of 789 is set in the PPC register 215. Accordingly, a request to access the I/O devices A and D is accepted, and a request to access the I/O devices B and C is rejected. As described above, 123 or other such code information is access protection information that associates the type of task executed by the CPU 210 and whether or not to protect an I/O device from an access for the task.

The code information in Table 1 is determined by a bit array. A bit array of the code information can be changed in accordance with a combination of I/O devices to protect. In the example of Table 1, a pair of I/O devices is protected, but the number of I/O devices to protect is not limited to two, and a combination of three or more devices may be protected, of course.

Figure 3:
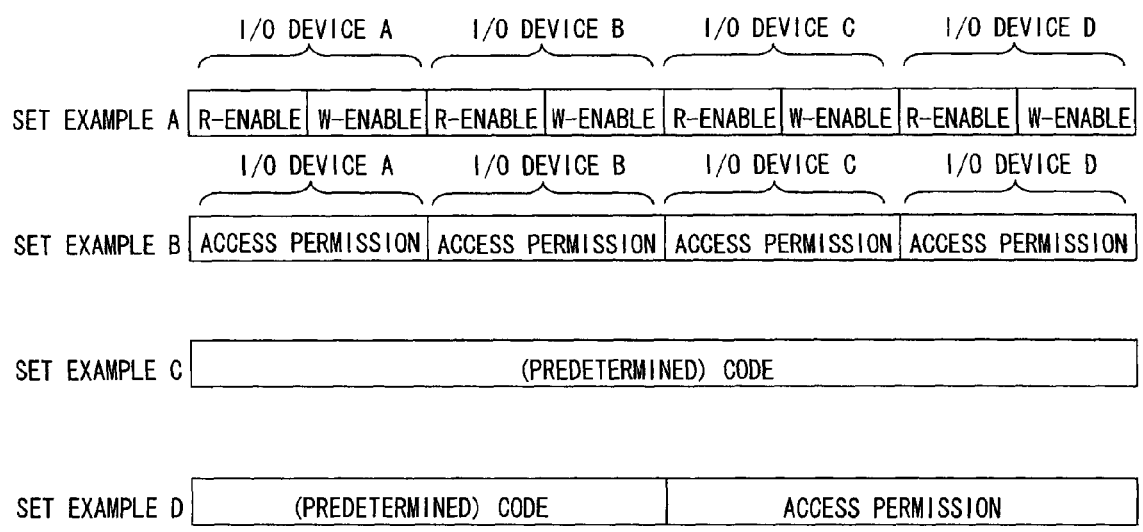
FIG. 3 shows a setting example of a PPC register of the first embodiment.

FIG. 3 shows variations on code information. In Set Example A, a read-enable (R-enable) bit and a write-enable (W-enable) bit are set every I/O device. If accepted, "1" is set; if rejected, "0" is set. For example, if a Read access to the I/O device A is permitted, and accesses to the other I/O devices are inhibited, a permission bit value of "10000000" is set as the code information. Further, as another mode of Set Example A, a read/write-enable bit (R/W-enable bit) may be added.

In Set Example B, a permission bit for accepting an access by the CPU (access permission bit) is set every I/O device. Similar to Set Example A, "1" is set for permitting an access, and "0" is set for inhibiting an access. For example, if an access to the I/O device A is permitted and accesses to the other I/O devices are inhibited, a permission bit value of "1000" is set as the code information.

In Set Example C, as shown in Table 1, code information of a predetermined bit array is set. The code information associates the kind of task executed by the CPU 210 with access protection information about a peripheral device to be protected from the task. The code information is set in accordance with the kind of I/O device to protect and a combination of I/O devices. As the code information, a task number itself may be set in the form of binary code. Further, Set Example D may include code information of Set Example C and permission bit for each I/O device as illustrated in Set Examples A and B.

As a feature of the first embodiment, in the case of protecting an I/O device from an access of the CPU 210, a protective region is set based on code information that specifies an I/O device to protect, not an address of the I/O device. The code information specifying the access protection region is set in the PPC register 215. Hence, it is unnecessary to determine whether or not an I/O device is protected for each address unlike the technique of Japanese Unexamined Patent Application Publication No. 2003-280988, so it is possible to dispense with H/W provided for each address.

Incidentally, the memory protective unit 211 includes a peripheral protection violation register 216. The peripheral protection violation register 216 stores a bit representing that a request to access an I/O device protected from accesses by the CPU 210 (hereinafter referred to as "access violation") is made based on access protection information if the access violation is detected. That is, the peripheral protection violation register 216 is an access violation setting unit.

The peripheral access bus 240 includes a bus 241 for outputting permission information from the PPC register 215 and a bus 242 for outputting address information of an I/O device which the CPU 210 requests permission to access. That is, the peripheral access bus 240 combines the bus 241 and the bus 242. Incidentally, each I/O device may be connected to the CPU 210 through plural bus lines. Further, the CPU 210 may be connected with the I/O devices 220 and 230 like a star network. Further, a bus bridge may be provided between the peripheral access bus 240 and the CPU 210, which configuration is not shown for ease of illustration.

Next, components of the I/O devices 220 and 230 are described. The following description is focused on the I/O device 220, but the same applies to the I/O device 230. Incidentally, description about the resources 224 and 234 is given above and thus omitted here. The I/O device 220 includes the protection information determination unit 221, the access detecting unit 222, the decoder 223, the I/F 226, and the resource 224. Further, the protection information determination unit 221, the access detecting unit 222, and the decoder 223 constitute the access control circuit 225. Incidentally, although not shown for ease of illustration, the I/O device 220 may include plural resources 224. Signals are input/output between the plural resources 224 and the I/F 226 through an internal bus (not shown) of the I/O device 224.

The protection information determination unit 221 determines whether or not an access request from the CPU 210 is accepted based on the code information set in the PPC register 215. If the access request is accepted, permission information is sent to the decoder 223. In contrast, if the access request is rejected, disablement information is sent to the decoder 223.

The access detecting unit 222 receives a signal including address information of an I/O device as a target of access request from the CPU 210. The access detecting unit 222 determines a target of the access request based on the received address information.

Information detected with the protection information determination unit 221 and the access detecting unit 222 are input to the decoder 223. Here, the information detected with the protection information determination unit 221 represents whether or not an access by the CPU 210 is permitted. On the other hand, the information detected with the access detecting unit 222 represents whether or not an access is directed to it s own device (I/O device 220). Based on these input information, the decoder 223 is a determination unit for determining whether or not to output control signals for controlling operations of reading/writing data from/to the resource 224.

If the access request from the CPU 210 is directed to the I/O device 220 and is permitted, the decoder 223 permits accesses to the resource 224. If the access request from the CPU 210 is not directed to the I/O device 220 or is inhibited, the decoder 223 inhibits accesses to the resource 224.

Incidentally, a signal is output to the resource 224 through the I/F 226. Necessary signals such as a read/write signal are input to the I/F 226 only when the decoder 223 permits accesses to the resource 224. Regarding the I/O device 230 as well, the same processing as the I/O device 220 is carried out. Operations of the CPU 210 that accesses the I/O devices 220 and 230 are described in detail below.

As described above, the access control circuit 225 is composed of the protection information determination unit 221, the access detecting unit 222, and the decoder 223. Accordingly, the access control circuit 225 is an access control unit for controlling accesses by the CPU 210 to an I/O device based on access protection information associated with code information and address information of an I/O device as a target of access request. Further, the access control circuit 225 limits accesses by the CPU 210 to the resource 224 of the I/O device 220.

Further, the access control circuit 225 detects access protection violation if an access request to an I/O device protected from accesses by the CPU 210 is made and notifies the peripheral protection violation register 216 of the violation. To be specific, if the protection information determination unit 221 determines that an access request from the CPU 210 is rejected based on code information in the PPC register 215, disablement information is output to the decoder 223. The decoder 223 sends a signal representing the access protection violation to the peripheral protection violation register 216. As a result, the peripheral protection violation register 216 stores information that inhibited access to the I/O device 220 is made (for example, a bit of "1"). If plural I/O devices are provided, the peripheral protection violation register 216 stores data having plural bits corresponding to each I/O device and stores access violation information for each I/O device suffering access protection violation.

Figure 4:
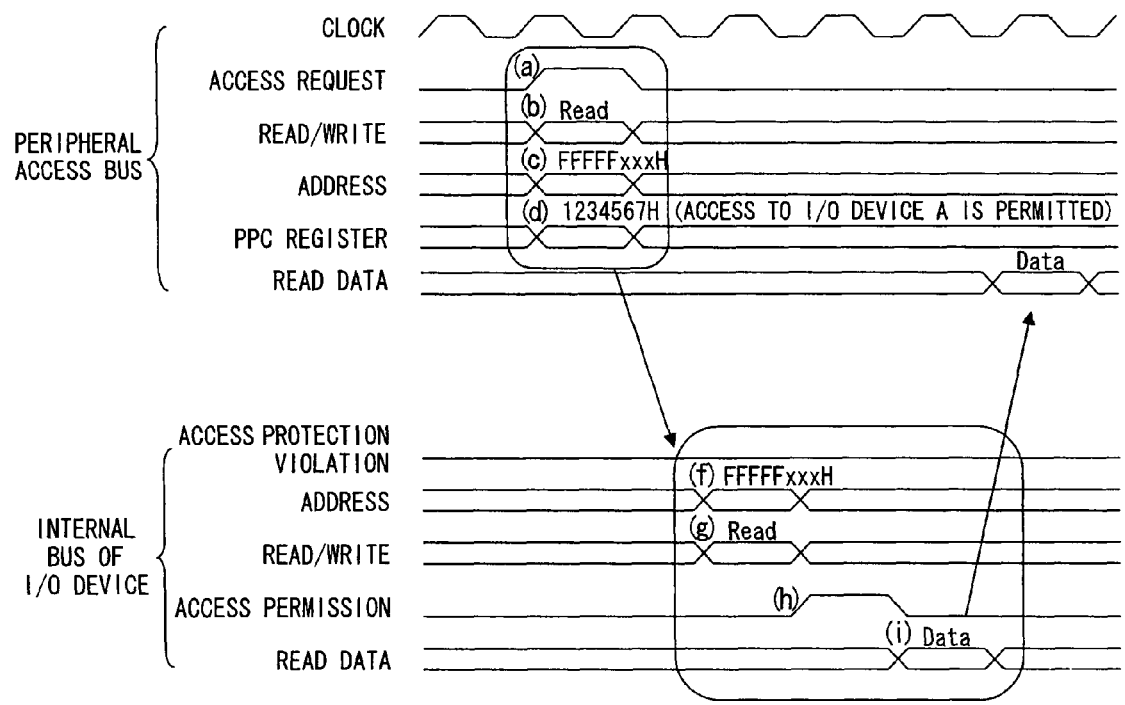
FIG. 4 is a timing chart at the time of allowing an access in the first embodiment.
Figure 5:
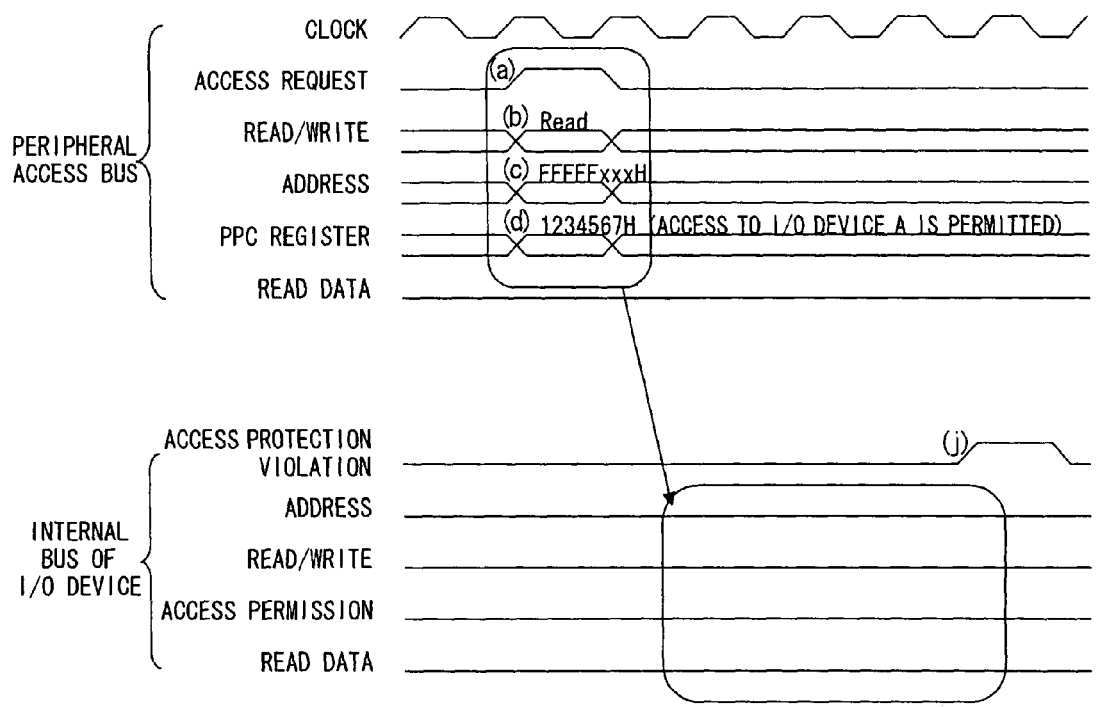
FIG. 5 is a timing chart at the time of disallowing an access in the first embodiment.
Figure 6:
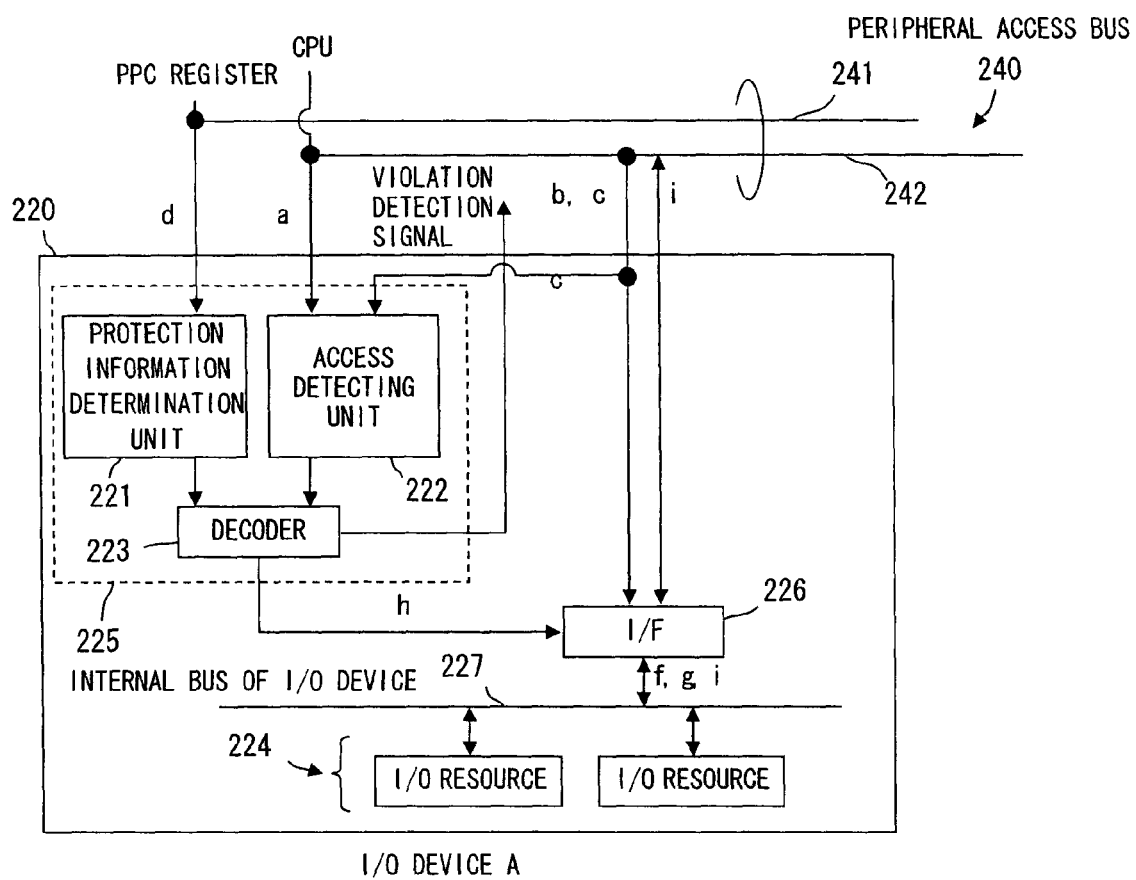
FIG. 6 is a detailed block diagram of an I/O device of the first embodiment.

Next, operations of the CPU 210 accessing the I/O devices 220 and 230 are described with reference to FIGS. 4 and 5 and optionally to FIGS. 2 and 6. FIGS. 4 and 5 are timing charts of operations of the CPU 210 accessing the I/O device 220. Referring to FIG. 4, operations of the CPU 210 are described in the case where an access request from the CPU 210 is accepted. Referring to FIG. 5, operations of the CPU 210 are described in the case where an access request from the CPU 210 is rejected. Referring to FIG. 6, operations of the CPU 210 accessing the I/O device 220 are described for illustrative purposes. FIG. 6 is a detailed block diagram of the I/O device 220 of FIG. 2 and its signal input/output path. Although not shown in FIG. 2 for ease of illustration, plural resources 224 may be provided in the I/O device 220 as shown in FIG. 6. Signals are input/output between the plural resources 224 and the I/F 226 through the I/O device internal bus 227. Incidentally, in the following description, the situation that an access request is accepted is synonymous with the situation that an I/O device is not protected from the access request. Further, the situation that an access request is rejected is synonymous with the situation that an I/O device is protected from the access request.

In FIG. 4, if the CPU 210 sends an access request signal (a) to the I/O device 220, a read/write signal (b) and an address signal (c) of the I/O device as an access target are output to the I/O device through the peripheral access bus 240. More specifically, as shown in FIG. 6, the access request signal (a) and the address signal (c) are output from the CPU 210 to the access detecting unit 222 through the bus 242. The read/write signal (b) is input from the CPU 210 to the I/F 226 through the bus 242. On the other hand, in the memory protective unit 211 (see FIG. 2), it is determined whether or not address information of an I/O device as an access target is registered in the PPA register 212 or whether or not a mode of the CPU 210 is a user mode by the determination unit 214. Based on the determination result, a signal (d) representing code information associated with each task in the PPC register 215 is output to the protection information determination unit 221 through the bus 241 as shown in FIG. 6. Accordingly, the signal (d) in the PPC register 215, the read/write signal (b), and the address signal (c) are output to the I/O devices 220 and 230 through the peripheral access bus 240 concurrently with the output of the access request signal (a).

The protection information determination units 221 and 231 of the I/O devices 220 and 230 determine whether or not an access request is accepted based on the signal (d) from the PPC register 215. At the same time, the access detecting units 222 and 232 of the I/O devices 220 and 230 determine whether or not an access request is directed to the I/O devices 220 and 230 based on the address signal (c). Then, the decoders 223 and 233 determine whether or not an access request from the CPU 210 is sent to the resources 224 and 234.

Referring to FIGS. 4 and 6, the case of accepting a read access request from the CPU 210 to the I/O device 220 is described for illustrative purposes. Thus, in the I/O device 220 an access to which is permitted, the address signal (c) output from the CPU 210 as well as the access request signal (a) is input to the access detecting unit 222. The read signal (b) output from the CPU 210 is input to the I/F 226. In the access detecting unit 222, a detection signal to the effect that an access is directed to the I/O device 220 is output to the decoder 223. Further, the signal (d) output from the PPC register 215 is input to the protection information determination unit 221. In the protection information determination unit 221, a detection signal to the effect that an access is permitted is output to the decoder 223. As a result, the decoder 223 outputs the read enable signal (h). On the other hand, the address signal (f) of the I/O resource 224 an access to which is requested by the CPU 210 and the read signal (g) are output from the I/F 226 to the I/O resource 224 through the I/O device internal bus 227. Hence, read data (i) is output from the accessed I/O resource to the CPU 210 in accordance with the read enable signal (h).

Referring next to FIG. 5, the case of rejecting a read access request from the CPU 210 to the I/O device 220 is described for illustrative purposes. If the CPU 210 sends an access request signal (a) to an I/O device, a read/write signal (b) and an address signal (c) of the I/O device as an access target are output to the I/O device through the peripheral access bus 240. More specifically, as shown in FIG. 6, the access request signal (a) and the address signal (c) are output from the CPU 210 to the access detecting unit 222 through the bus 242. The read/write signal (b) is input from the CPU 210 to the I/F 226 through the bus 242. On the other hand, in the memory protective unit 211 of FIG. 2, it is determined whether or not address information of an I/O device as an access target is registered in the PPA register 212 or whether or not a mode of the CPU 210 is a user mode by the determination unit 214. Based on the determination result, a signal (d) representing code information associated with each task in the PPC register 215 is output to the protection information determination unit 221 through the bus 241 as shown in FIG. 6. Accordingly, the signal (d) in the PPC register 215, the read/write signal (b), and the address signal (c) are output to the I/O devices 220 and 230 through the peripheral access bus 240 concurrently with the output of the access request signal (a). The above steps are the same as those in the case of permitting an access request as shown in FIG. 4.

The protection information determination units 221 and 231 of the I/O devices 220 and 230 receive the signal (d) output from the PPC register 215. It is determined whether or not an access request is accepted. At the same time, the access detecting units 222 and 232 of the I/O devices 220 and 230 determine whether or not an access is directed to the I/O devices 220 and 230 based on the address signal (c). Then, the decoders 223 and 233 determine whether or not to output an access request from the CPU 210 to the resources 224 and 234.

FIG. 5 illustrates the case of inhibiting an access. Thus, the address signal (c) output from the CPU 210 is input to an access detecting unit of an I/O device protected from an access. The access detecting unit outputs a detection signal that an access is directed to its own device to the decoder. Further, the signal (d) output from the PPC register 215 is input to the protection information determination unit 221. The protection information determination unit 221 outputs a detection signal that an access is inhibited to the decoder. Hence, no read enable signal is output from the decoder, and resources are not accessed.

Incidentally, as shown in FIG. 5, if a request to access an I/O device protected from an access request from the CPU 210 is made, the access protection violation signal (j) is detected. This signal indicates that a request to access an object of protection is detected, that is, access protection violation occurs. The access protection violation signal (j) is output from the decoders 223 and 233, and bit information (for example, "1") representing access protection violation is set to a bit corresponding to the I/O device 220 and stored in the peripheral protection violation register 216. That is, the peripheral protection violation register 216 is an access violation setting unit for setting information representing access protection violation. If access protection violation information is set in the peripheral protection violation register 216, interrupt notification is issued to the CPU 210, and a mode is shifted to the privileged mode. Then, the OS executes exceptional process. During the exceptional process, the OS performs necessary processing such as references the peripheral protection violation register 216 to check an I/O device suffering the access protection violation or saves address information of an I/O device suffering the access protection violation and then resets (clears) the bit.

If access protection violation information is set in the peripheral protection violation register 216, the I/O device receives (information set in the PPC register 215) from the CPU 210 and inhibits an access. Incidentally, which a bit indicating access protection violation is being set in the peripheral protection violation register 216, an access to a corresponding I/O device is cancelled. Then, the OS references the peripheral protection violation register 216 to set new code information corresponding to a task directed to an I/O device an access to which is aborted, in the PPC register 215.

The PPC register 215 may be reset by the OS such that the register is updated for each task to perform. Further, since the access protection violation occurs, the mode register 213 shifts a mode from the user mode to the privileged mode.

Beneficial effects of the first embodiment are described next. As described above, the PPC register 215 storing code information associated with an I/O device to be protected from accesses of the CPU 210 is provided, making it unnecessary to determine whether or not an I/O device is protected for each address unlike the related art. Thus, it is possible to dispense with H/W provided for each address.

For example, the INTC control register regions 104 and 105 in the memory-mapped I/O 100 of FIG. 1 are scattered over plural addresses and have many addresses. In the first embodiment, a target range can be collectively protected only by setting code information associated with the INTC control register regions 104 and 105 in the PPC register 215. As a result, an I/O device having many addresses can be set with no limitations on H/W. Thus, it is possible to simplify the circuit configuration of the information processing apparatus and reduce a cost for setting addresses or processing time.

Further, if logically integrated I/O devices like the INTC control register regions 104 and 105 are scattered over plural addresses, a target range can be collectively protected to thereby avoid an error in setting an address.

Further, if access protection violation occurs in complicated configuration where I/O devices are scattered over plural addresses, exceptional process should be carried out on I/O devices scattered over many addresses during handling of the exceptional process, resulting in a failure that it takes much time to execute exceptional process. In the first embodiment, a desired value is set in the peripheral protection violation register 216 to thereby make it unnecessary to execute exceptional process on I/O devices scattered over many addresses during handling of the exceptional process, so a period necessary for the exceptional process can be advantageously reduced.

Further, in the first embodiment, until a bit indicating the access protection violation is reset in the peripheral protection violation register 216, an access to a corresponding I/O device is aborted. Accordingly, access protection violation does not occur due to another factor until the resetting. As a result, it is possible to save values in the memory-mapped register upon the exceptional process.

Second Embodiment

Next, a second embodiment of the present invention is described. The second embodiment also describes a single-chip information processing apparatus integrated to a semiconductor element such as LSI for illustrative purposes, but the present invention is not limited to the one-chip information processing apparatus as in the first embodiment. Further, the second embodiment describes an example of protecting a memory-mapped I/O from accesses from a CPU similar to the first embodiment. The same components and operations of the information processing apparatus as those of the first embodiment are omitted here.

Figure 7:
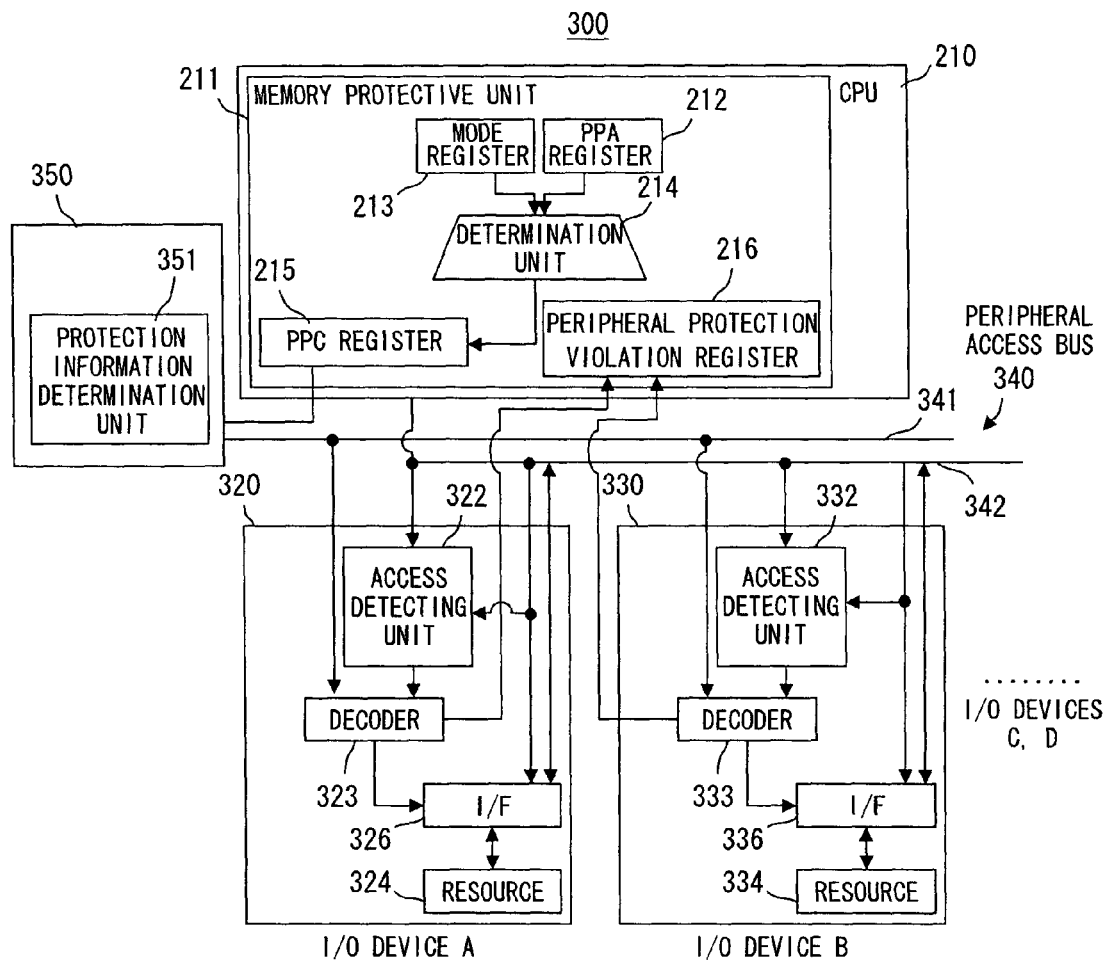
FIG. 7 is a block diagram of an information processing apparatus according to a second embodiment of the present invention.

Referring to FIG. 7, an access protection function of the second embodiment is described. FIG. 7 is a block diagram of an information processing apparatus of the second embodiment. An information processing apparatus 300 includes the CPU 210, two I/O devices 320 and 330, a peripheral access bus 340, and a peripheral protection unit 350. The CPU 210 includes the memory protective unit 211. The configuration and function of the memory protective unit 211 are the same as those of the first embodiment.

The I/O devices 320 and 330 include access detecting units 322 and 332, decoders 323 and 333, I/Fs 326 and 336, and resources 324 and 334, respectively. The number of I/O devices in the information processing apparatus 300 is not limited to 2 as in the first embodiment. Signals are input/output between the CPU 210 and the I/O devices 320 and 330 through the peripheral access bus 340. A bus 341 in the peripheral access bus 340 transmits permission information from the PPC register 215 to I/O devices 420 and 430 through the peripheral protection unit 350. A bus 342 of the peripheral access bus 340 outputs address information of an I/O device to be protected from an access request of the CPU 210.

The second embodiment differs from the first embodiment in that the peripheral protection unit 350 is provided between the PPC register 215 and the bus 341. The peripheral protection unit 350 includes a protection information determination unit 351. The protection information determination unit 351 combines the protection information determination units 221 and 231 provided in each I/O device as shown in FIG. 2, and functions and operations of the protection information determination unit 351 are the same as those of the protection information determination units 221 and 231 of the first embodiment. That is, in the protection information determination unit 351 of FIG. 7, plural circuit blocks of the same circuit configuration as those of the protection information determination units 221 and 231 of FIG. 2 are provided. Hence, the peripheral protection unit 350 is an integrated unit including a protection information determination unit related to plural I/O devices. On the other hand, the I/O devices 320 and 330 of FIG. 7 differ from the I/O devices 220 and 230 of FIG. 2 in that the protection information determination units 221 and 231 are omitted. Incidentally, signals from the PPC register 215 are output from the peripheral protection unit 350 to the I/O devices 320 and 330 through the bus 341. A bus line is connected to plural I/O devices and plural I/O devices and the CPU 210 are connected like star network as in the first embodiment. Further, a bus bridge may be provided between the peripheral access bus 340 and the CPU 210.

If the CPU 210 makes a request to access an I/O device, code information corresponding to the requested I/O device is set in the PPC register 215. Then, the code information stored in the PPC register 215 is output to the protection information determination unit 351 of the peripheral protection unit 350. The protection information determination unit 351 determines whether or not an access request from the CPU 210 is accepted and sends a determination result to the I/O devices 320 and 330. In other words, the peripheral protection unit 350 determines whether or not accesses to the I/O devices 320 and 330 are permitted based on code information stored in the PPC register 215 in a concentrated manner. Then, an I/O device selection signal is output to an I/O device not protected from accesses by the CPU 210. Subsequent operations are the same as those of the first embodiment.

Owing to the above configuration, it is unnecessary to provide the protection information determination unit for each I/O device as shown in FIG. 2. Accordingly, it is unnecessary to determine whether or not to protect each I/O device from accesses each time the CPU 210 makes an access request. As a result, a burden is placed on neither the bus 341 nor the I/O devices 320 and 330, so an effect of improving processing efficiency of the information processing apparatus is produced.

Third Embodiment

Next, a third embodiment of the present invention is described. The third embodiment also describes a single-chip information processing apparatus integrated to a semiconductor element such as LSI for illustrative purposes, but the present invention is not limited to the one-chip information processing apparatus as in the first embodiment. Further, the third embodiment describes an example of protecting a memory-mapped I/O from accesses from a CPU similar to the first embodiment. The same components and operations of the information processing apparatus as those of the first and second embodiments are omitted here.

Figure 8:
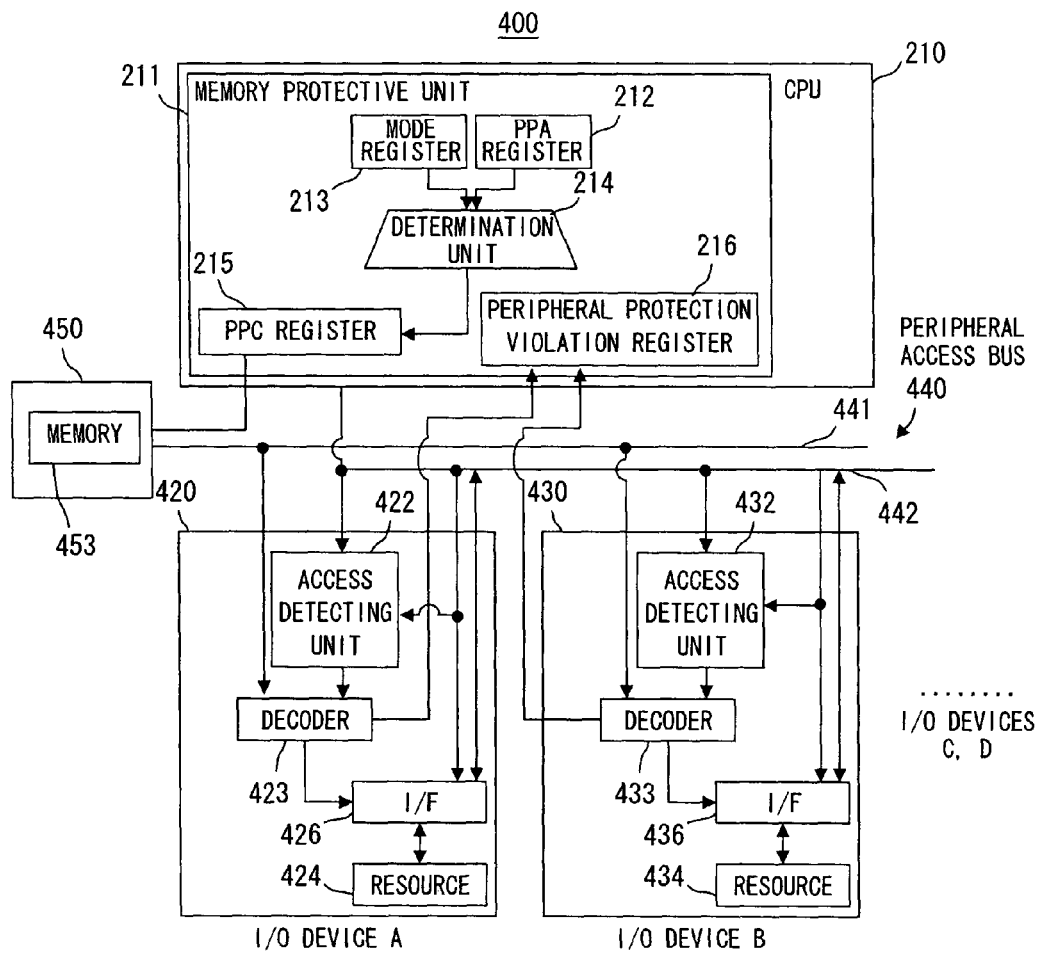
FIG. 8 is a block diagram of an information processing apparatus according to a third embodiment of the present invention.

Referring to FIG. 8, an access protection function of the third embodiment is described next. FIG. 8 is a block diagram of an information processing apparatus of the third embodiment. An information processing apparatus 400 includes the CPU 210, two I/O devices 420 and 430, a peripheral access bus 440, and a peripheral protection unit 450. The CPU 210 includes the memory protective unit 211. The configuration and function of the memory protective unit 211 are the same as those of the first embodiment.

The I/O devices 420 and 430 include access detecting units 422 and 432, decoders 423 and 433, I/Fs 426 and 436, and resources 424 and 434. The number of I/O devices in the information processing apparatus 400 is not limited to 2 similar to the first embodiment. Signals are input/output between the CPU 210 and the I/O devices 420 and 430 through the peripheral access bus 440. A bus 441 of the peripheral access bus 440 transmits permission information from the PPC register 215 to the I/O devices 420 and 430 through the peripheral protection unit 450. A bus 442 of the peripheral access bus 440 transmits address information of an I/O device an access to which is requested by the CPU 210.

In the third embodiment, the peripheral protection unit 450 includes a memory 453. The memory 453 is a rewritable memory element, for example, a RAM (Random Access Memory) or a nonvolatile memory. The memory 453 stores a mapping table that associates code information set in the PPC register 215 with access protection information. For example, such information that accesses to the I/O devices A and B are permitted if code information of 123 is set in the PPC register 215 in accordance with a task to be performed with the CPU 210 (see Table 1) is stored in the mapping table of the memory 453.

If the CPU 210 makes an access request, the PPC register 215 accesses the memory 453. The peripheral protection unit 450 outputs an access permission/inhibition information to the I/O devices 420 and 430 based on the mapping table stored in the memory 453. For example, if a value of 123 is set in the PPC register 215, a signal for permitting accesses to I/O devices A and B (I/O devices 420 and 430 in FIG. 8) is output from the peripheral protection unit 450 (see Table 1). That is, the memory 453 has the same function as that of the protection information determination units 221, 231, and 351 of the first and second embodiments. Subsequent operations are the same as those of the first embodiment. In the I/O devices 420 and 430, the decoders 423 and 433 determine whether or not to send a request to the resources 424 and 434 based on information from the peripheral protection unit 450 and information from the access detecting units 422 and 433.

Incidentally, in the peripheral protection unit 450, it is possible to determine which I/O device is protected through decoding based on the mapping table stored in the memory 453. In this case, decoded information is output as an I/O device selection signal toward an I/O device an access to which is permitted.

Owing to the above configuration, in the third embodiment, it is unnecessary to provide a H/W-based protection information determination unit. That is, the circuit configuration can be simplified. Hence, the configuration of the third embodiment is more effective against the problem that the number of I/O devices to protect from accesses is limited under limitations on the H/W.

Fourth Embodiment

Next, a fourth embodiment of the present invention is described. The fourth embodiment also describes a single-chip information processing apparatus integrated to a semiconductor element such as LSI for illustrative purposes, but the present invention is not limited to the one-chip information processing apparatus as in the first embodiment. Further, the fourth embodiment describes an example of protecting a memory-mapped I/O from accesses from a CPU similar to the first embodiment. The same components and operations of the information processing apparatus as those of the first to third embodiments are omitted here.

Figure 9:
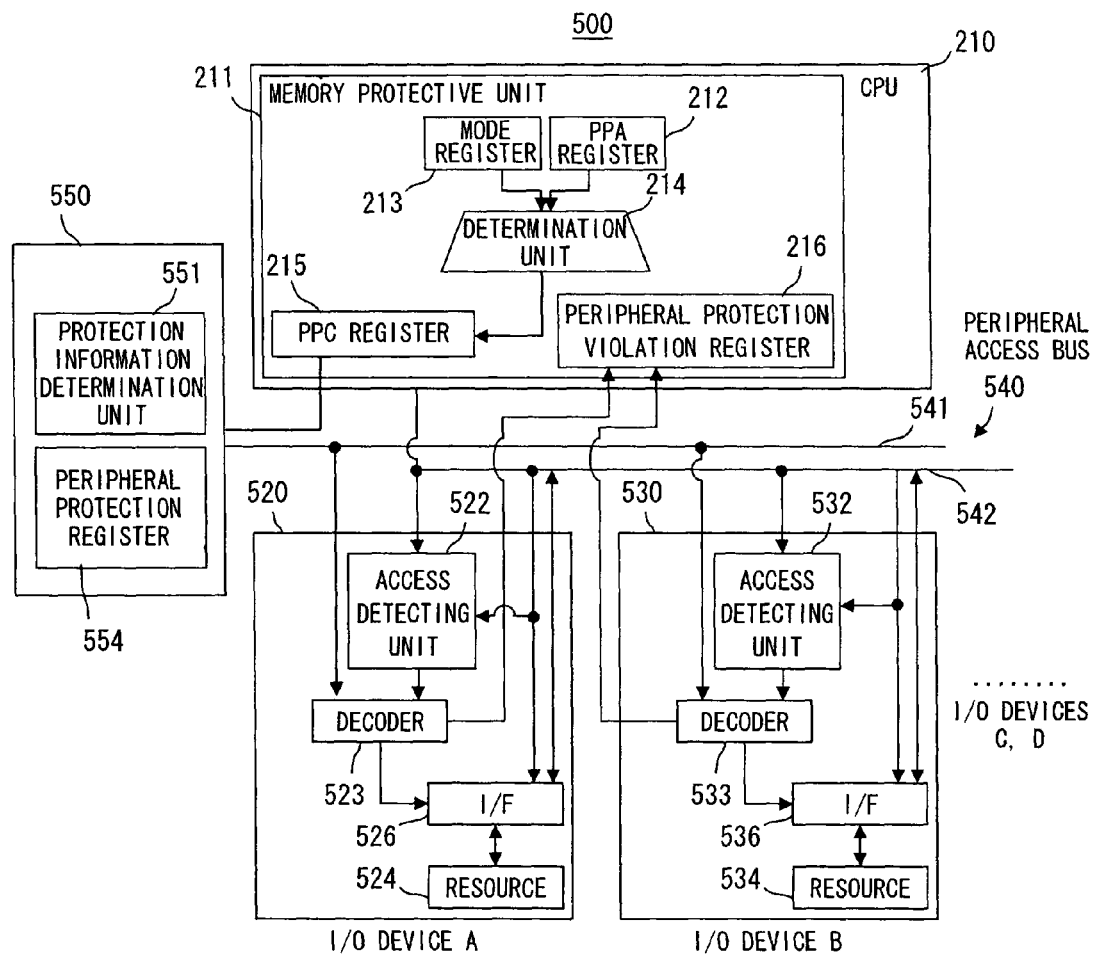
FIG. 9 is a block diagram of an information processing apparatus according to a fourth embodiment of the present invention.

Referring to FIG. 9, an access protection function of the fourth embodiment is described next. FIG. 9 is a block diagram of an information processing apparatus of the fourth embodiment. An information processing apparatus 500 includes the CPU 210, two I/O devices 520 and 530, a peripheral access bus 540, and a peripheral protection unit 550. The CPU 210 includes the memory protective unit 211. The configuration and function of the memory protective unit 211 are the same as those of the first embodiment.

The I/O devices 520 and 530 include access detecting unit 522 and 532, decoders 523 and 533, I/Fs 526 and 536, and resources 524 and 534. The number of I/O devices in the information processing apparatus 500 is not limited to 2 as in the first embodiment. Signals are input/output between the CPU 210 and the I/O devices 520 and 530 through the peripheral access bus 540. The peripheral access bus 540 includes a bus 541 transmitting permission information from the PPC register 215 through the peripheral protection unit 550 to an I/O device and a bus 542 transmitting address information of an I/O device an access to which is requested by the CPU 210.

The peripheral protection unit 550 includes a protection information determination unit 551 and a peripheral protection register 554. A feature of the fourth embodiment resides in a peripheral protection register 554 provided in the peripheral protection unit 550. The peripheral protection register 554 is a register for designating an I/O device to protect from accesses by the CPU 210. That is, the peripheral protection register 554 stores information similar to the information set in the PPC register 215. The peripheral protection register 554 of the fourth embodiment can further extend protection information set in the PPC register 215 of the CPU 210.

As for protection information represented by bits in the peripheral protection register 554, settings of the protection information can be changed without modifying H/W of the CPU 210 and I/O device in accordance with a change of the I/O device. In many cases, the CPU 210 and I/O devices are separately designed, so it is difficult to change a design in midstream or after the completion of designing. In such cases, settings of the protection information can be easily changed with the peripheral protection register 554. In the fourth embodiment, it is determined which I/O device is protected from accesses by the CPU 210 based on logical OR between information from the peripheral protection register 554 and information from the PPC register 215.

If the CPU 210 makes an access request, a signal representing information about an I/O device as a target of protection determined based on logical OR between information from the PPC register 215 and information from the peripheral protection register 554 is output to the protection information determination unit 551. The protection information determination unit 551 sends information about whether or not an access by the CPU 210 is permitted to the decoders 523 and 533 of the I/O devices 520 and 530. Subsequent operations are the same as those of the first embodiment.

In this way, protection information set on the CPU 210 side (PPC register 215) and protection information set with an I/O device on the peripheral protection unit 550 side (peripheral protection register 554) are separately managed to thereby set protection information in accordance with a change of I/O device. That is, it is unnecessary to determine which I/O device is protected at the design stage of the CPU, and an I/O device to protect can be flexibly changed at the time of designing I/O devices or changing an I/O device. This is particularly effective for the case where a general-purposed CPU is used and which I/O devices are used is not yet determined.

Fifth Embodiment

Next, a fifth embodiment of the present invention is described. The fifth embodiment also describes a single-chip information processing apparatus integrated to a semiconductor element such as LSI for illustrative purposes, but the present invention is not limited to the one-chip information processing apparatus as in the first embodiment. Further, the fifth embodiment describes an example of protecting a memory-mapped I/O from accesses from a CPU similar to the first embodiment. The same components and operations of the information processing apparatus as those of the first to fourth embodiments are omitted here.

Figure 10:
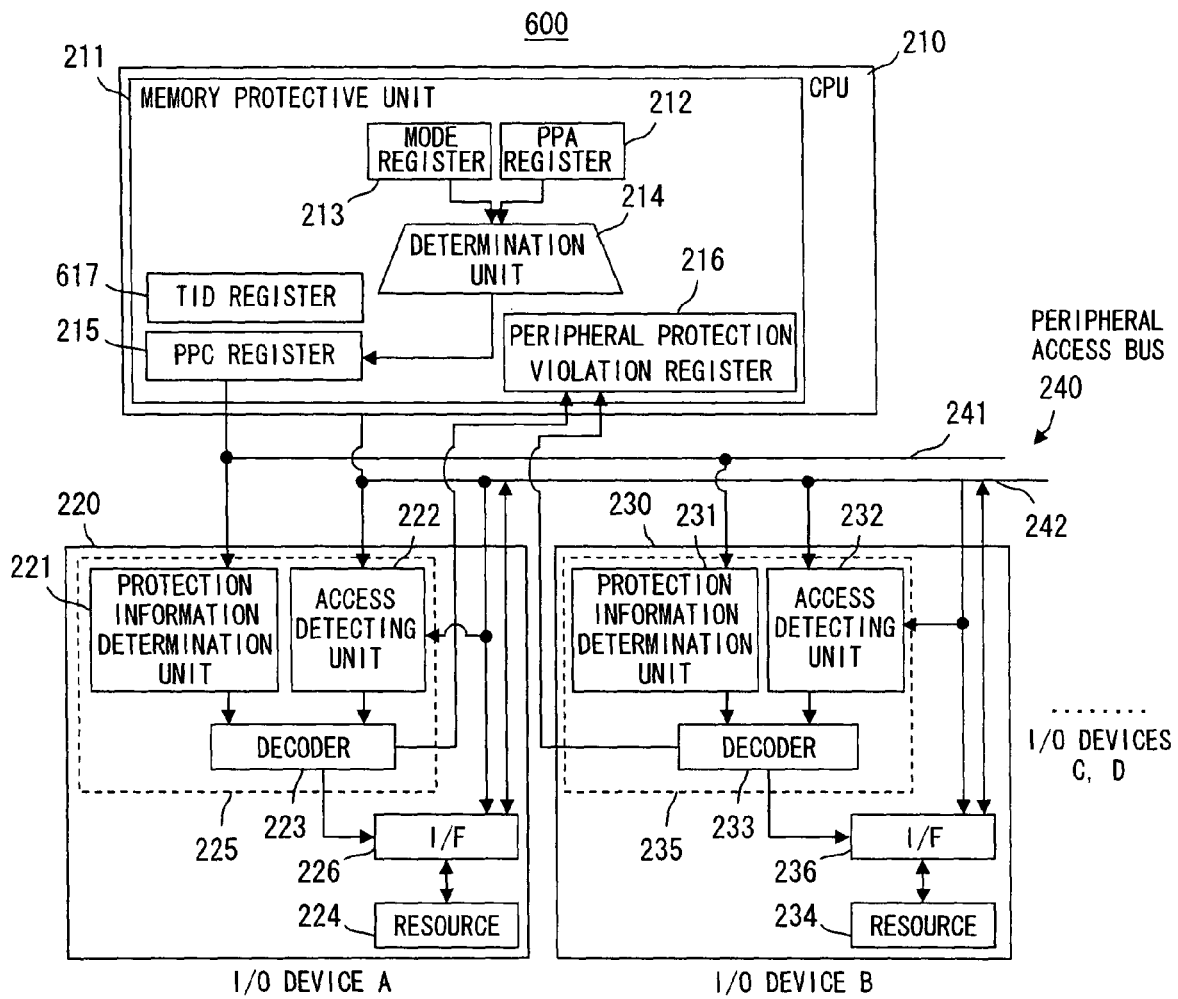
FIG. 10 is a block diagram of an information processing apparatus according to a fifth embodiment of the present invention.

Referring to FIG. 10, an access protection function of the fifth embodiment is described next. FIG. 10 is a block diagram of an information processing apparatus of the fifth embodiment. An information processing apparatus 600 includes the CPU 210, two I/O devices 220 and 230, and the peripheral access bus 240. The CPU 210 includes the memory protective unit 211. The configuration and function of the memory protective unit 211 are the same as those of the first embodiment.

A feature of the fifth embodiment resides in a TID (Task ID: task identification) register 617 provided in the memory protective unit 211. In the TID register, a task identification number necessary for accesses to an address to protect is set. Hence, it is possible to set an I/O device to protect for each task.

If the CPU 210 makes an access request, information from the PPC register 215 and the TID register 617 are input to the protection information determination units 221 and 231 of the I/O devices 220 and 230. Thus, an I/O device to protect is detected for each task and notified to the decoders 223 and 233. Subsequent operations are the same as those of the first embodiment.

Owing to the above configuration, even if there are plural tasks, an I/O device to protect can be set for each task. Therefore, in the case where a large-scale OS or plural CPUs perform plural tasks, finer control can be executed.

Incidentally, in the above embodiments, although the present invention is applied to the one-chip information processing apparatus integrated to a semiconductor element such as LSI, the invention is not limited to the one-chip information processing apparatus and a CPU or I/O device may be integrated to another element.

It is apparent that the present invention is not limited to the above embodiments, but may be modified and changed without departing from the scope and spirit of the invention.

What is claimed is:

1. An information processing apparatus, comprising:
    a CPU (Central Processing Unit);
    a plurality of peripheral devices connected to the CPU through a bus;
    a peripheral access protection setting unit storing access protection information representing whether an access to each of the peripheral devices is permitted or inhibited, the access protection information being set with respect to each of a task to be performed by the CPU;
    an access control unit controlling an access to the plurality of peripheral devices based on the access protection information and address information of the peripheral device; and
    a protection address setting unit setting an address range of a peripheral device to protect from an address,
    wherein whether or not the CPU makes an access request is determined based on the address range set by the protection address setting unit.

2. The information processing apparatus according to claim 1, wherein the access control unit includes:
    a protection information determination unit determining whether or not the access by the CPU is permitted based on the access protection information;
    an access detecting unit determining whether or not an access request is made based on address information output from the CPU; and
    a determination unit determining whether or not to permit the access by the CPU based on information from the protection information determination unit and the access detecting unit.

3. The information processing apparatus according to claim 2, wherein the protection information determination unit is provided in the peripheral device.

4. The information processing apparatus according to claim 2, wherein the protection information determination unit comprises an integrated determination unit for the plurality of peripheral devices, and is provided between the CPU and the peripheral devices.

5. The information processing apparatus according to claim 2, wherein the protection information determination unit includes a memory element storing a mapping table associating the access protection information with access protection information.

6. The information processing apparatus according to claim 1, wherein an address request signal is output from the CPU to the peripheral devices concurrently with an output of a signal representing the access protection information to the access control unit.

7. The information processing apparatus of claim 1, wherein the peripheral access protection setting unit comprises:
    a PPA (Peripheral Protection Address) register storing address information regarding an address range of a peripheral device to be protected from accesses from the CPU;
    a mode register storing whether a current mode of the CPU is a privileged mode or a user mode, said privileged mode used for executing an operating system and allowing access to any peripheral device, said user mode used for application programs other than said operating system wherein access to one or more I/O devices is disallowed;
    a determination unit determining whether to output an access request signal based on current information in the PPA register and the mode register; and
    a PPC (Peripheral Protection Control) register storing setting information coded to a peripheral device rather than an address of said peripheral device, said peripheral device potentially having a plurality of addresses.

8. The information processing apparatus of claim 7, wherein each said peripheral device comprises:
    at least one resource selectively utilized by said CPU;
    an interface to exchange signals between said at least one resource and said bus; and
    a decoder that controls said interface so that said resource is connected to said bus,
    said information processing apparatus further comprising:
        a protection information determination unit that accepts or denies an access request from said CPU to a specific peripheral device, based on the coded information of said PPC register, said protection information determination unit controlling the decoder of said specific peripheral device.

9. An information processing apparatus, comprising:
    a CPU (Central Processing Unit);
    a plurality of peripheral devices connected to the CPU through a bus;
    a peripheral access protection setting unit storing access protection information representing whether an access to each of the peripheral devices is permitted or inhibited, the access protection information being set with respect to each of a task to be performed by the CPU; and
    an access control unit controlling an access to the plurality of peripheral devices based on the access protection information and address information of the peripheral device,
    wherein said task comprises a thread and two or more threads are performed in parallel by the CPU, and the access protection information is set with respect to each thread.

10. An information processing apparatus, comprising:
    a CPU (Central Processing Unit);
    a plurality of peripheral devices connected to the CPU through a bus;
    a peripheral access protection setting unit storing access protection information representing whether an access to each of the peripheral devices is permitted or inhibited, the access protection information being set with respect to each of a task to be performed by the CPU; and
    an access control unit controlling an access to the plurality of peripheral devices based on the access protection information and address information of the peripheral device, wherein the CPU performs two or more tasks with time-sharing and the access protection information is set with respect to each task.

11. An information processing apparatus, comprising:
a CPU (Central Processing Unit);
a plurality of peripheral devices connected to the CPU through a bus;
a peripheral access protection setting unit storing access protection information representing whether an access to each of the peripheral devices is permitted or inhibited, the access protection information being set with respect to each of a task to be performed by the CPU; and
an access control unit controlling an access to the plurality of peripheral devices based on the access protection information and address information of the peripheral device,
wherein said task comprise a thread, said CPU comprises a multi-core processor, said multi-core processor performs two or more threads at the same time, and said access protection information is set with respect to each thread.

* * * * *